US005087313A

United States Patent [19]

Duecker

[11] Patent Number: 5,087,313

[45] Date of Patent: Feb. 11, 1992

[54] PAPER WEB ALIGNMENT SYSTEM

[75] Inventor: Peter Duecker, Langenfeld, Fed. Rep. of Germany

[73] Assignee: ARC Machinary Corporation, Matthews, N.C.

[21] Appl. No.: 418,106

[22] Filed: Oct. 6, 1989

Related U.S. Application Data

[63] Continuation-in-part of Ser. No. 322,805, Mar. 13, 1989.

[51] Int. Cl.$^5$ .............................................. B32B 31/08

[52] U.S. Cl. .................................... 156/271; 156/351; 156/355; 226/20; 226/95; 226/195; 83/428

[58] Field of Search ................. 156/64, 268, 271, 353, 156/355, 351; 226/18, 15, 19, 20, 95, 195, 196; 83/428

[56] References Cited

U.S. PATENT DOCUMENTS

| | | | |
|---|---|---|---|
| 3,407,706 | 10/1968 | Ott, Jr. . | |
| 3,533,542 | 10/1970 | Ziebolz et al. | 226/22 |
| 3,679,112 | 7/1972 | Black et al. | 226/19 X |
| 3,743,152 | 7/1973 | Greeves | 226/19 |
| 3,760,697 | 9/1973 | Besemann | 83/428 X |
| 4,077,579 | 3/1978 | Seleski et al. | 226/20 |
| 4,288,273 | 9/1978 | Butler, Jr. et al. | 156/361 |
| 4,392,910 | 7/1983 | Tokuno et al. | 156/361 |
| 4,453,659 | 6/1984 | Torpey | 226/20 |
| 4,475,422 | 10/1984 | Lawson | 83/428 X |
| 4,529,462 | 7/1985 | Buinewicz | 156/205 |
| 4,657,624 | 4/1987 | Buinewicz | 156/510 |
| 4,760,945 | 8/1988 | Zerle | 226/18 |
| 4,824,001 | 4/1989 | Mick, Jr. et al. | 226/20 X |

*Primary Examiner*—Michael W. Ball
*Assistant Examiner*—Mark A. Osele

[57] ABSTRACT

The invention is a method and apparatus for producing slit pieces of finished corrugated board from respective paper liners and at least one fluting using a corrugated line having at least a single facer, a double backer and a slitter, while minimizing or substantially eliminating waste resulting from the misalignment of the respective liners, flutings, single face web and corrugated product. The method comprises aligning the measured positions of a liner and fluting relative to one another and relative to the single facer prior to their respective entry into the single facer and in response to a signal representative of the relative measured positions, aligning the measured positions of a second paper liner and the single face web relative to one another and relative to the double backer prior to their entry into the double backer and in response to a signal representative of the measured positions by passing the single face web over a vacuum tensioning means that tensions the single face web, moving the vacuum tensioning means in order to concurrently move the tensioned single face web and align it with the second liner to accurately superimpose the second liner and the single face web upon one another, and aligning a measured position of the corrugated board with respect to the slitter in response to a signal representative of the measured position to minimize the error in alignment between the corrugated board and the slitter thereby producing slit cardboard with a minimum of waste.

35 Claims, 5 Drawing Sheets

PAPER WEB ALIGNMENT SYSTEM

FIELD OF THE INVENTION

This is a continuation-in-part of copending application Ser. No. 07/322,805, Filed Mar. 13, 1989, to Duecker for "Paper Web Alignment System." The invention relates to a paper web alignment system, and in particular relates to an apparatus and method for accurately and precisely aligning paper webs, flutings and liners that are brought together in a corrugator line to form a corrugated paper product.

BACKGROUND OF THE INVENTION

One of the most common packaging materials in present use is a combination of various layers of paper to form the corrugated paper product generally referred to as corrugated cardboard or simply cardboard. In general, this rather familiar material typically consists of at least two layers of generally flat paper between which is sandwiched a layer of corrugated or "fluted" paper. The resulting composite laminated structure is generally far more rigid than the paper materials from which it is formed, and is an excellent packaging material for many applications.

Such corrugated cardboard is typically formed in a sequence of relatively well known operations. First, a paper web is typically drawn from a supply roll and is drawn into a device known as a "single facer." A second paper web is drawn from a second supply roll and is also fed into the single facer. The single facer subjects one of the webs to heat and moisture, usually in the form of steam, and then advances it between a pair of ribbed rollers which distort the paper into its fluted or rippled configuration. Glue is then applied to the fluted web, usually on the tips of the flutes on one side of the web, and then the second web is brought into contact with the glue-carrying side of the fluted web. When the two webs are so fastened together, the resulting composite is generally referred to as a "single face web." The single face web is then advanced to another station generally referred to as a "double backer," as is yet another paper web generally referred to as a "liner." In the double backer, glue is typically applied to the corrugated portions of the single face web opposite the first liner and the second liner is then applied to the single face web to result in the cardboard construction in which the two flat layers of paper have the fluted layer sandwiched between them.

In typical operations, the various supplies of paper are kept on large rolls on the floor of a factory. Other portions of the machinery are kept directly above the supply rolls on a structure which is generally referred to as a "bridge conveyor" or just a "bridge." Typically, once the single face web is put together, it is forwarded along the bridge or bridge conveyor while the second liner which will complete the cardboard structure is advanced below the bridge or bridge conveyor.

In particular situations, the bridge conveyor can be used to temporarily store relatively large quantities of single face web to thereby form a buffer or an accumulator for the double backer if the single facer is slowed down or stopped for any reason. Alternatively, if the double backer is slowed or stopped, the bridge conveyor allows the single facer to run at normal speed and build up a supply of single face web on the bridge conveyor. In particular applications, the extra time that the single face web spends on the bridge conveyor prior to reaching the double backer gives the glue extra time for drying and bonding, resulting in better overall resulting structure.

Although the accumulator is useful for these purposes, the single face web that is allowed to loosely accumulate must generally be re-tensioned prior to entering the double backer. Accordingly, a corrugator line will also include some type of tensioning device for this purposes. Typical corrugating lines also include equipment which preconditions the various webs, using either heat or moisture or both prior to their reaching either the single facer or the double backer or both.

One constant problem with such corrugating lines or systems is the misalignment of the single face web and the liner when they are brought together at the double backer. As stated earlier, the single faced web is typically carried on a bridge conveyor while the liner is carried below the bridge conveyor. Although the various equipment for advancing the single face web and the liner can be aligned to a certain degree, there are always variations between the two. As a result, when the single face web and the liner are brought together in the double backer, the resulting cardboard will typically have edge portions which are uneven; i.e. the respective edge portions of the single face web and the liner will not match. In order to cure the misalignment, the cardboard typically has to be formed larger than its desired size and its edges trimmed of the respective excess.

For example, in the cardboard industry about 0.4 percent of production typically ends up as waste material directly attributable to the misalignment of the single face web with the liner. Because paper plants may average on the order of 50,000,000 square feet of product per month, even such a relatively small percentage would result in 200,000 or more square feet of alignment related scrap. Based on the cost of paper, the resulting loss can be tens to hundreds of thousands of dollars per year. Accordingly, various systems have been developed for attempting to accurately and precisely align a single face web with a liner. In some fashion, all of these systems incorporate either manual or automated sensing of the position of the single face web with respect to the liner, combined with some system for moving either the single face web or the liner to bring them into alignment with one another.

In one type of system, the alignment of the single face web and the liner is observed following their exit from the double backer and adjustments are made upstream along the corrugator line to correct the misalignment. This eventually improves the alignment, but a great deal of misalignment and resulting waste continues even following adjustment because of the relatively long distances in certain corrugating lines between the point at which the web or liner can be aligned and the point at which they are joined in the double backer and then observed as to their alignment.

In other types of systems, various mechanical devices are used to align the web and the liner such as edge guides and roller systems. Edge guides are disadvantageous because they move the web or the liner by pushing laterally against the edge of the web or liner, a technique which almost inevitably damages the edge being pushed so that the corrugated board which emerges from the double backer is still defective along one or the other or both of its edges, thus nullifying any advantages of the alignment.

Other aligning devices comprise the so called paper steering assemblies which require that various rollers underneath the moving web or liner be raised or lowered or otherwise maneuvered in a fashion which tilts the web or the liner to thereby encourage it to move to a different position. Needless to say, such devices, although conventional can be rather complicated and difficult to adjust precisely because of the secondary manner in which they align the web and the liner.

Yet other techniques attempt to align the web and the liner at a point well upstream of the point where tension is typically applied to both prior to their being forwarded into the double backer. Although this theoretically has the advantage of aligning the single face web and the liner when they are not under tension and therefore less likely to be damaged, in reality the far upstream alignment of the two provides continued opportunity for them to become misaligned again before they enter the double backer.

Additionally, those familiar with the manufacture of corrugated products also recognize that waste can occur in the original manufacture of the single faced web at the single facer and also during the slitting-scoring process that usually takes place following the manufacture of the double backed web.

In a typical single facer, two paper rolls each feed respective supplies of paper into the single facer. One is formed into the fluting, the other is joined to the fluting as the liner to form the single face web. Where the two paper supply rolls or the paths of paper that lead from them are misaligned, the resulting single face web will be characterized by excess fluting on one edge and excess liner on the other, both of which will eventually need to be trimmed, adding to the waste problem described earlier.

At the other end of the corrugating line, the slitter-scorer is the device that both cuts the corrugated product into various shapes that can later be made into packages, and also scores the corrugated board so that it will fold along certain lines as it is being manufactured into a typically rectangular package. A typical finished corrugated board will generally move laterally with respect to its path of travel depending upon the movement of the corrugator belt in the double backer. As a result, the position of the corrugated board is not fixed when it leaves the double backer and in order to produce an accurate package precursor, the slitter-scorer must be aligned with the corrugated board.

Accordingly, it is an object of the present invention to provide an apparatus and method for aligning a single face web and a liner, or several webs with each other and with a liner, in which the respective positions of the single face web and the liner are determined with a high degree of accuracy and precision and in which the position of the single face web or liner can be continuously accurately and precisely adjusted, especially in small known and desired increments, to bring the single face web and the liner into alignment. Furthermore, the determination of the alignment or misalignment of the web and the liner should take place relatively close to the position at which the two paths are adjusted so that the potential for the web and liner to become misaligned between the point of adjustment and the point of observation is substantially or totally eliminated.

It is a further object of the present invention to provide a method of producing slit or slit and scored pieces of finished corrugated board from a paper web material while minimizing or substantially eliminating waste during the production of the single face web, during production of the corrugated board, and during the slitting and scoring of the corrugated board into a package precursor.

SUMMARY OF THE INVENTION

Therefore, the invention comprises an alignment apparatus for aligning paper webs superimposed upon one another such as the single face web and liner which are brought together to form one or more layers of corrugated cardboard type material. The apparatus comprises a bridge and conveyor system between a single facer and a double backer which includes a bridge guide. The bridge guide comprises vacuum tensioning means for applying a desired tension to the single face web formed at the single facer. Respective light sources and detectors adjacent the vacuum tensioning means identify the position of the single face web and the position of the paper liner and generate respective signals in response to these positions. The vacuum tensioning means is adjustable in response to the signals identifying the relative positions of the single face web and the second paper liner so that the single face web can be adjustably positioned with respect to the paper liner so that any misalignment between the single face web and the paper liner is minimized or eliminated when the single face web and the second paper liner are brought together to form a corrugated paper product.

The foregoing and other objects, advantages and features of the invention, and the manner in which the same are accomplished, will become more readily apparent upon consideration of the following detailed description of the invention taken into conjunction with the accompanying drawings, which illustrate preferred and exemplary embodiments, and wherein:

DETAILED DESCRIPTION OF THE PREFERRED EMBODIMENT

Figures 1, 2:
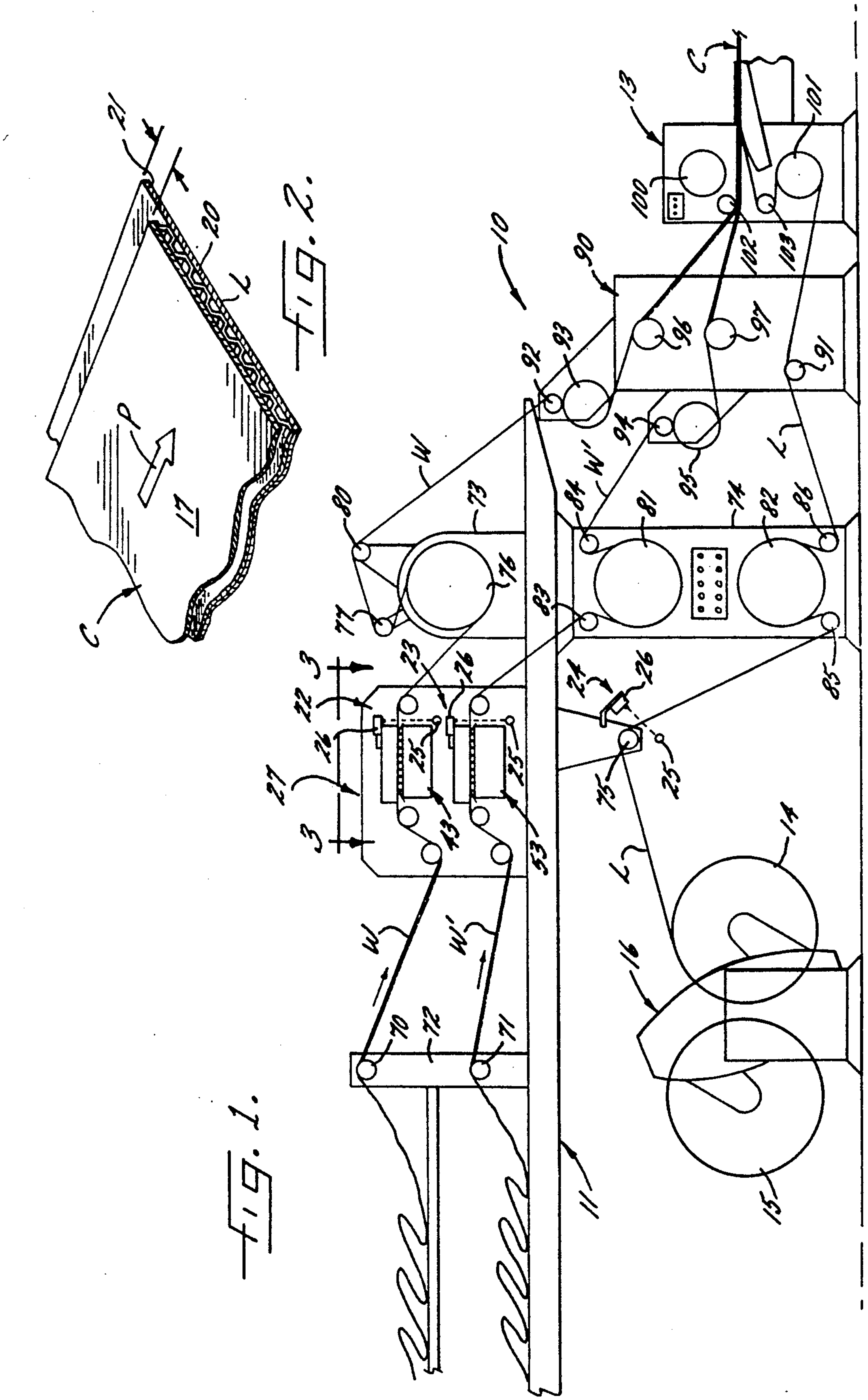
FIG. 1 is a side elevational view of a portion of a typical corrugator line which incorporates the present invention.
FIG. 2 is a partial cross-sectional perspective view of a portion of corrugated cardboard material.

An overall view of a corrugator line 10 which incorporates features of the present invention is set forth in FIG. 1. The corrugator line provides the means for advancing a single face web along a first predetermined path of travel. As used herein, the designation "single face web" refers to a laminate formed of a first substantially planar paper liner and a fluted paper backing. In FIG. 1, two such single face webs are illustrated and for the sake of clarity and description the upper single face web is designated at W and the lower single face web is designated at W'. It will be understood by those familiar with corrugator lines and methods of producing corrugated paper products that corrugator lines often carry more than one such web and liner depending on the desired structure of the final product, but that the description of the preferred embodiment and the claims which follow, although written in singular terms can apply to as many webs and liners as a corrugator line might carry.

In the diagram of FIG. 1, the single face webs W and W' are shown as existing laminates. As discussed later herein, a corrugator line will also typically include a single facer which adds the fluted paper backing to a substantially planar paper liner, and may additionally have the function of initially forming flutes in planar stock paper. The nature and operation of a typical single facer does not affect or change the nature of the present invention, and any otherwise acceptable and conventional device can be used in conjunction with the present invention.

As further illustrated in FIG. 1, the webs W and travel along hardware which is positioned on an elevated horizontal platform generally designated at 11 and which is commonly referred to as a bridge, or bridge conveyor, which maintains a portion of the corrugator line 10 at an elevated position with respect to the floor 12. This hardware, which will be further described later herein, is carried by the bridge 11 and advances the single face web along a first predetermined path of travel between a single facer and the illustrated double backer generally designated at 13 where the single face web and liner are joined to form the corrugated paper product C.

The corrugator line 10 also includes means for forwarding a second substantially planar paper liner along a second predetermined path of travel. In FIG. 1, this liner is designated at L and travels from stock supply rolls 14 and 15 which are carried on the roll stand 16. The liner L also eventually travels to the double backer 13 to be formed into the corrugated paper product C.

As illustrated in FIG. 1, the respective first and second paths of travel have upstream and downstream portions with the upstream portions being defined by the single facer and bridge, and the downstream portions being defined by the double backer. The upstream portions of the first and second paths are in spaced superimposed relationship with one another, while the downstream portions of the paths converge in superimposed relationship at the double backer 13 to bring the single face web and the second paper liner into contact with one another. The double backer fastens the single face web and the liner to one another to form the corrugator paper product of the fluted paper sandwiched between two paper liners. The second paper liner L thus represents an objective with which the first and second single face webs W and W' must be aligned.

FIG. 2 is an illustration of the resulting corrugated paper product C. For the sake of clarity, in FIG. 2 the first substantially planar paper liner is designated at 17, the fluted paper backing is designated at 20 and the liner is again designated as L. FIG. 2 also illustrates, in more or less exaggerated fashion, one of the problems addressed by the present invention, namely the misalignment of the single faced web and the liner L. This excessive edge portion is designated at 21.

The invention further comprises a detector system illustrated as the first optical means broadly designated at 22 and 23 and positioned along the upstream portion of the first path of travel for identifying the exact position of the respective single face webs W and W'. Similarly, a second optical means generally designated at 24 is positioned along the upstream portion of the second path of travel for identifying the exact position of the liner L.

Figure 5:
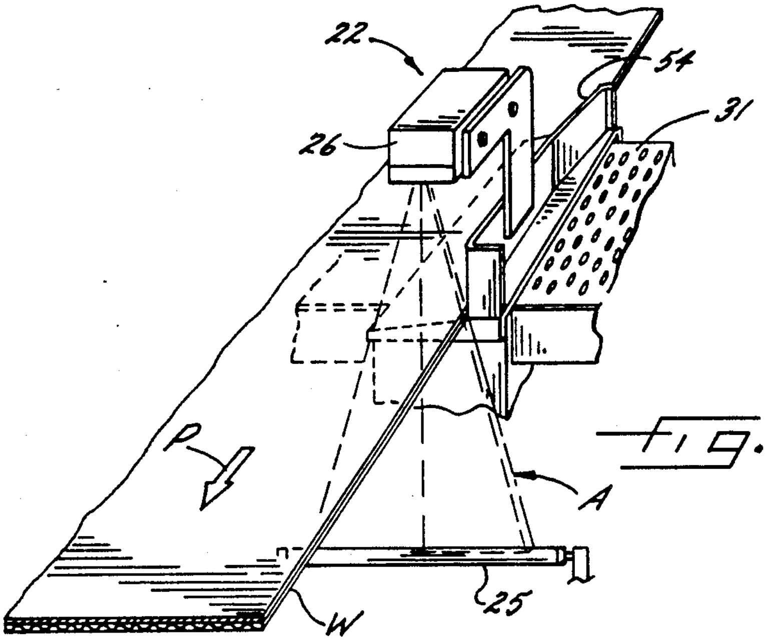
FIG. 5 is a partial perspective view showing the relationship of a light source, a detector, the bridge guide, and the path of travel of the single face web according to the present invention.
Figure 6:
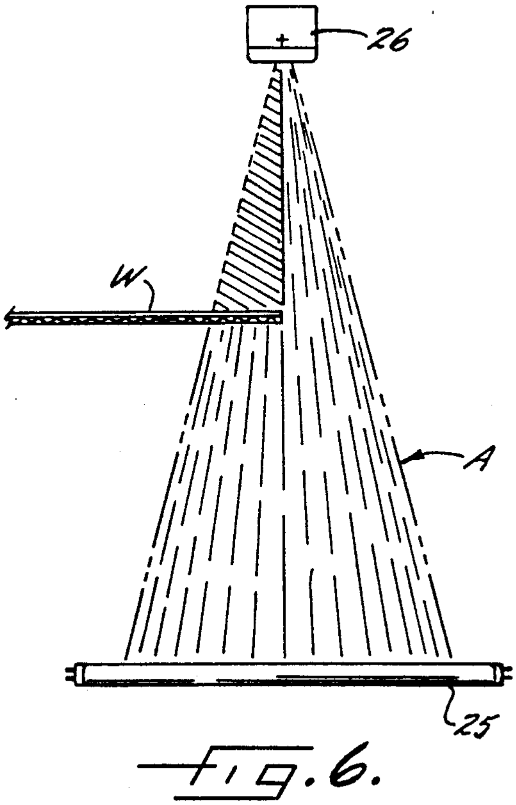
FIG. 6 is a side elevational view of the source, detector, and single face web illustrated in FIG. 5.
Figure 7:
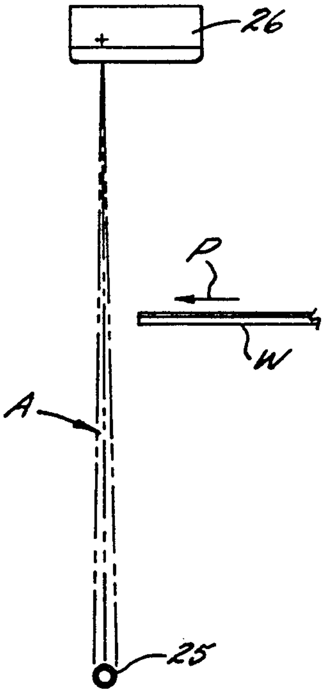
FIG. 7 is another elevational view of the elements in relationship shown in FIG. 5, but taken perpendicularly to the view of FIG. 6.

As shown in more detail in FIGS. 5, 6 and 7, each of the respective optical means comprises a light source 25 and a detector 26. In a particular preferred embodiment, the source comprises a fluorescent light bulb and the detector comprises a line scanning camera that will be discussed further later herein. Each of the detectors generates a signal representing the identified position of the respective web or liner.

In conjunction with the respective optical means, the corrugator line 10 also includes means positioned along the respective upstream portions of the first and second paths of travel for aligning the identified exact positions with one another along the respective upstream portions of the paths of travel so that any misalignment between the single face web W and the paper liner L is minimized or eliminated at the downstream portions of the respective paths where the web W and liner L are brought together. In a preferred embodiment of the invention, the aligning means is shown as the tensioning device broadly designated at 27 which maintains a desired tension in the single face web W as the web is forwarded along the first predetermined path of travel. It is understood by those familiar with the manufacture of corrugated paper products that maintaining an appropriate tension in the web W, particularly just prior to its entry into the double backer 13, is an important step in the proper production of such corrugated paper products.

In the invention, the position of the tensioning device 27 can be adjusted while the device 27 tensions a single face web W so that adjustment of the position of the tensioning device 27 adjusts the position of the single face web W along the first predetermined path of travel and thereby aligns the single face web with the second paper liner as the liner L is forwarded along the second predetermined path of travel. In this embodiment, the liner L and its monitored position form a pilot track against which the monitored position or track of the single face web W is measured and adjusted.

Figure 3:
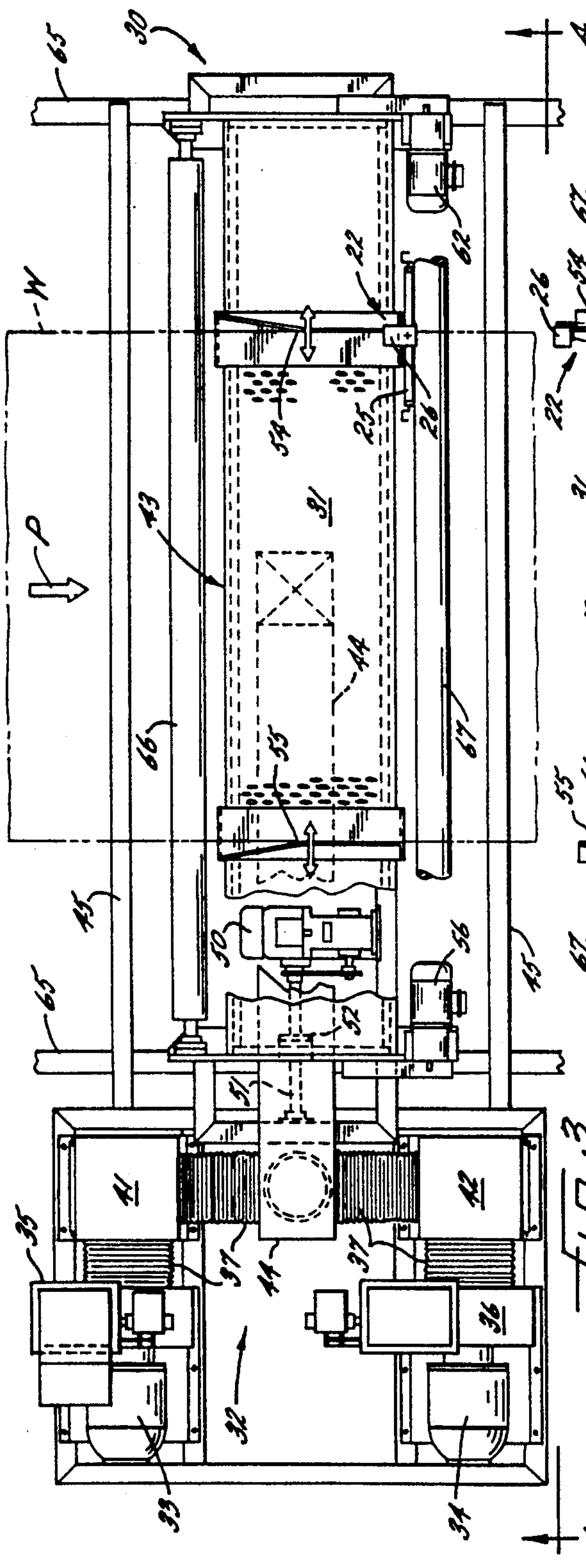
FIG. 3 is a top plan view of a bridge guide which incorporates the adjustable vacuum means according to the present invention.
Figure 4:
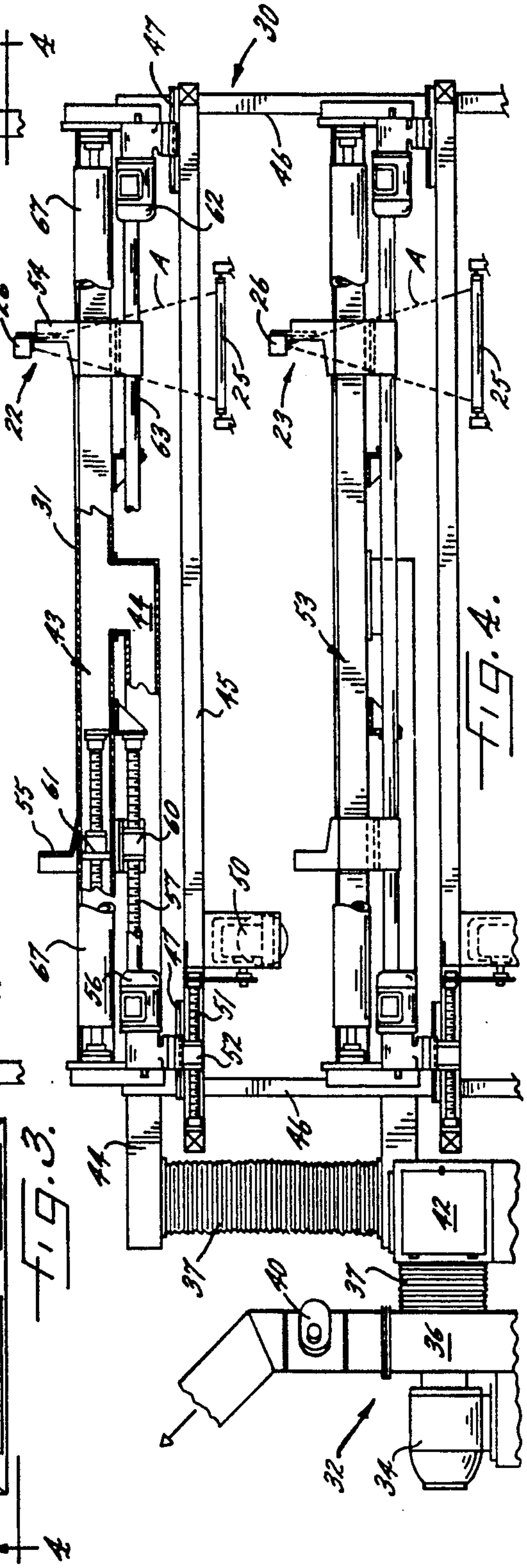
FIG. 4 is an elevational view taken along lines 4—4 of FIG. 3.

In a most preferred embodiment, the tensioning device comprises a vacuum tensioning device which is broadly designated at 30 in FIGS. 3 and 4. As illustrated in FIGS. 3 and 4, the vacuum tensioning means 30 includes a vacuum platen 31 across which the single face web W travels and through which a vacuum suction is applied to the single face web W as it travels thereacross. The vacuum suction urges the single face web W against the vacuum platen 31 and thereby applies a desired tension to the single face web W as it travels from the single facer to the double backer 13. Suction means for applying a vacuum suction to the vacuum platen are broadly designated at 32 and include a number of various elements which will be described in more detail later herein.

The position of the vacuum tensioning means 30 is adjustable in response to the relative positions of the single face web which are identified by the respective sources and detectors 25 and 26 so that the single face web W can be adjustably positioned with respect to liner L. As a result, any misalignment between the single face web W and the paper liner L is minimized or eliminated when the single face web and the second paper liner are brought together to form the corrugator paper product C.

As further illustrated in FIGS. 3 and 4, the suction means 32 includes the motors 33 and 34 which drive suction fans (not shown) which are maintained in housings 35 and 36 adjacent the motors 33 and 34 respectively. Suction is applied through a series of hoses, which for the sake of simplicity are all designated at 37. The suction means also includes a damper 40 for adjusting the flow of suction air, as well as the filters 41 and 42.

The vacuum platen 31 represents the upper surface of a suction chamber 43 which is connected to the suction hoses 37 by the suction pipe 44. As best seen in FIG. 4, the entire suction chamber is mounted on a frame having horizontal members 45 and vertical members 46. Horizontal members 45 carry rails 47 at either end thereof upon which the entire suction chamber 43 can be moved. A motor 50 which operates in conjunction with a threaded shaft 51 and follower 52 together can move the entire suction chamber and associated elements laterally on the frame portions 45 and 46. In this manner, adjustment of the position of the suction chamber 43 adjusts the position of the single face web W which is moving across the vacuum platen 31.

At this point it should be noted that the structure and operation of the lower suction chamber, which for purposes of discussion is only generally designated at 53 is essentially identical in structure and operation to the upper suction chamber 43 and its associated elements, and will not be otherwise further discussed.

In the preferred embodiment of the invention, the width of paper which the tensioning means 30 can handle is adjustable. As best illustrated in FIG. 3, the single face web W, although tensioned and positioned by the suction applied through the vacuum platen 31, is also bordered by side guides 54 and 55. These are adjustable by the operation of the motor 56, threaded shaft 67 and follower 60. Together the motor 56, the shaft 57 and follower 60 move the left-hand side guide 55 and a corresponding baffle 61 positioned inside the vacuum chamber 43. The baffle 61 defines the outer edge of the vacuum chamber 43 to which suction is applied.

On the right-hand of the device, yet another motor 62 drives a similar shaft and follower which are respectively covered by the shaft housing 63 and follower housing 64 in the view of FIG. 4. Another baffle (not shown) is inside the housing 64 and likewise corresponds in position to the position of the right-hand side guide 54 so that the two baffles define the extent of the chamber 43 to which suction is applied and thereby maximize the suction applied to the single face web W traveling across the vacuum platen 31.

In the embodiment illustrated in FIGS. 3 and 4, the suction chambers 43 and 53 are individually and independently adjustable so that the path or track of both of the single face webs W and W' can be aligned with the track of the liner L.

FIGS. 3 and 4 show certain other details of the vacuum tensioning means 30, including additional horizontal frame members 65, idler rolls 66 and 67, the light source 25 and the detector 26, the operation of which will be discussed in more detail with respect to FIGS. 5, 6 and 7. In a typical embodiment, a tensioning device such as the one illustrated in FIGS. 3 and 4 can handle a single face web which has a width of between about 50 and 100 inches (1200–2500 mm).

Accordingly it can be seen from FIGS. 3 and 4 and the accompanying description that as suction is applied to the web W, it is applied in an amount which is sufficient to tension the web W to the desired extent while still allowing the web W to travel along the corrugator line 10 between a single facer and the double backer 13. As the entire vacuum tensioning means 30 is moved laterally, (i.e. left or right in the orientation of FIGS. 3 and 4) the vacuum tensioning means will likewise move the web W in the same direction.

FIGS. 5, 6 and 7 illustrate in greater detail how the optical means of the invention operate to identify the respective positions of the single face web W and the liner L. As shown in FIG. 5, in a preferred embodiment the light source 25 is a fluorescent bulb and the detector 26 is a line scanning camera. Either the bulb 25 or the camera 26 is positioned toward one side of the predetermined path of travel indicated by the arrow P, and substantially perpendicular to both the path of travel P and the plane of the respective web W or liner L, with the other positioned on an opposite side of the predetermined path travel P and similarly substantially perpendicular to the both the path of travel P and the plane of the respective web or liner. The source 25 and the detector 26 define a light path or curtain therebetween so that the interference of the respective web W or liner L with the light curtain identifies the position of the respective paper liner or web.

As further illustrated in FIGS. 5, 6 and 7, in the preferred embodiment the bulb 25 and camera 26 are positioned so that an edge of the respective web W interferes with the light curtain, and the position of the web is correspondingly identified by identifying the position of its edge. It will be understood that in the illustrated embodiment the camera 26 is shown as being positioned above the web W and the bulb beneath it, but that the opposite configuration would be the structural and functional equivalent of the illustrated arrangement.

In the preferred embodiment, the camera 26 comprises a line sensing camera operating on the optical light passage principle. The object to be measured passes through the light curtain formed by the light source. When an object is positioned between the source and the camera, it creates a silhouette image which is evaluated by the camera. In this embodiment the camera is equipped with a built-in central processing unit (CPU) which is programed for various control functions which relate to the identification of the edge of the web in the overall setup of the invention. One such camera includes a linear sensor with high resolution and high sensitivity having 1024 picture elements (or "pixels"). Once set up and adjusted, the camera operates on the principle of identification of light-dark transitions. For example, in FIGS. 5, 6 and 7, the light curtain which is defined by the sensor portion of the camera and the light emanating from the bulb 25 is broadly designated at A. When the web W passes through the light curtain A, as perhaps best illustrated in FIG. 6, it creates a light-dark transition in the light curtain which can be identified by the camera 26. Because the camera has such a large number of pixels it can identify the position or size of objects such as the edge of the web with a resolution as great as 0.2 to 0.5 mm.

One such type of camera is available from K. A. Schmersal GMBH & Co., Postfach 24 04 25, Moddinghofe, D-5600 Wuppertal 2, Federal Republic of Germany. The structure and operation of the camera is more completely described in their publication, "Schmersal CCD Line Scanning Camera OM1024 Operation and Calibration Instructions," November 1987, the contents of which are incorporated entirely herein by reference.

In the preferred embodiments of the invention, the output signal from the camera can be in binary or binary coded decimal form, using either serial or parallel ports. The output signal is sent to a central processing unit (CPU) such as a personal computer or its equivalent, either of which can be obtained and used in generally and readily available fashion familiar to those in this and other arts. The CPU in turn compares the signal from two or more cameras to one another and then generates a voltage output signal corresponding to the information from the camera and the desired movement of the web guide to be aligned. This voltage signal is sent to a voltage-frequency converter, of which any generally available and otherwise acceptable standard device is appropriate. This converter sends a frequency signal to the desired motor. In the illustrated embodiments, the three cameras product three output signals. The CPU uses one of these as the reference signal for the pilot track, and uses the other two to compare the positions and then produce the voltage and frequency signals that eventually drive the motors which adjust the position of the other two tracks or paths.

It will thus be seen that the invention provides the unique advantage of a floating reference, in that the paths or tracks of any number of webs and liners need only be aligned with respect to one another, rather than to an arbitrary reference point. For example, in the illustrated embodiment, the Liner L need not be overly precisely aligned with respect to the machinery, but instead need only be identified as to its position. The webs W and W' can then be aligned against the position of the liner L. In summary, only two positions need to be aligned in order to align three items.

It will thus been seen that by using an optical system which can detect the position of the web W and liner L to an accuracy on the order of tenths of millimeters, the present invention provides a high degree of accuracy in locating the position of the respective webs and liners in the corrugating line and offers a precise apparatus for adjusting the web and liner with respect to one another as compared to the earlier systems of physically pushing the edges of the paper or attempting to use roller guides to make the rather strict adjustments necessary to minimize or eliminate wastage.

For the sake of completeness, a number of other features of the corrugator line 10 will now be described. As best illustrated in FIG. 1, the single face webs W and W' travel along the bridge 11 and cross respective idlers 70 and 71 which are carried by a frame 72 prior to their entry into the tensioning device 27. Following the exit of the respective webs W and W' from the tensioning device 27, they are directed, along with the liner L into respective preheaters 73 and 74. It will be noted in FIG. 1 that the liner L does not pass through a tensioning device as such, but is carried over another idler roll 75 adjacent to the optical means 24 in the form of the bulb 25 and camera 26. The preheater 73 includes a main heating drum 76 and idler rolls 77 and 80 which position the web W for its further travel along the corrugator line 10. In a similar fashion preheater 74 includes two main heating drums 81 and 82 With the second single face web W' passing around drum 81 and the liner L passing around drum 82. Single face web W' is likewise positioned by idler rolls 83 and 84 and the liner L by idler rolls 85 and 86. As known to those familiar with such devices, such preheaters are typically used to raise the temperature of the paper in the single face webs and the liner to a temperature appropriate for further handling and manufacture, particularly including the gluing steps.

Accordingly, upon exiting the respective preheaters 73 and 74, the webs W and W', and the liner L enter a glue station 90. As illustrated, the liner L merely passes through the glue station across idler 91 on its way to the double backer 13 because in many typical embodiments glue is not applied to the liner, but rather to the single face web or webs. In this regard, the upper single face web W passes through rollers 92 and 93 as it enters the glue station 90, and lower web W' similarly travels across rollers 94 and 95 in the same fashion. Inside the glue station 90, the respective webs pass across application rollers 96 and 97 which typically apply glue to the fluted portions of the single face webs W and W'.

Upon exiting the glue station 90, the one or more webs and the liner are brought together in the double backer 13, which is illustrated as having alignment rollers 100, 101, 102 and 103, to form the final corrugated paper product C.

It will be further understood that the invention comprises the method of aligning a single face web and a liner as the single face web and liner are being separately advanced along a corrugating line towards a double backer. The method comprises applying a vacuum to a portion of the single face web as it is advanced along the corrugating line, which vacuum is sufficient to impart a desired tension to the single face web while allowing the web to continue to travel under tension towards the double backer. The relative position of the portion of the single face web to which the vacuum is being applied is identified, as is the position of the corresponding portion of the liner to thereby determine any misalignment in these respective positions which would result in misalignment and waste in the resulting corrugated paper product. Finally, the method comprises adjusting the position of the portion of the single face liner to which the vacuum is applied to thereby adjust the position of the entire single face web with respect to the liner so that any misalignment of the single face web and the liner is minimized or eliminated and any waste edges in the resulting corrugated paper product are likewise minimized or eliminated.

In the preferred embodiments, the method comprises identifying the relative positions using the optical system described herein and adjusting the position of the single face web using the vacuum tensioning means described herein.

Figure 8:
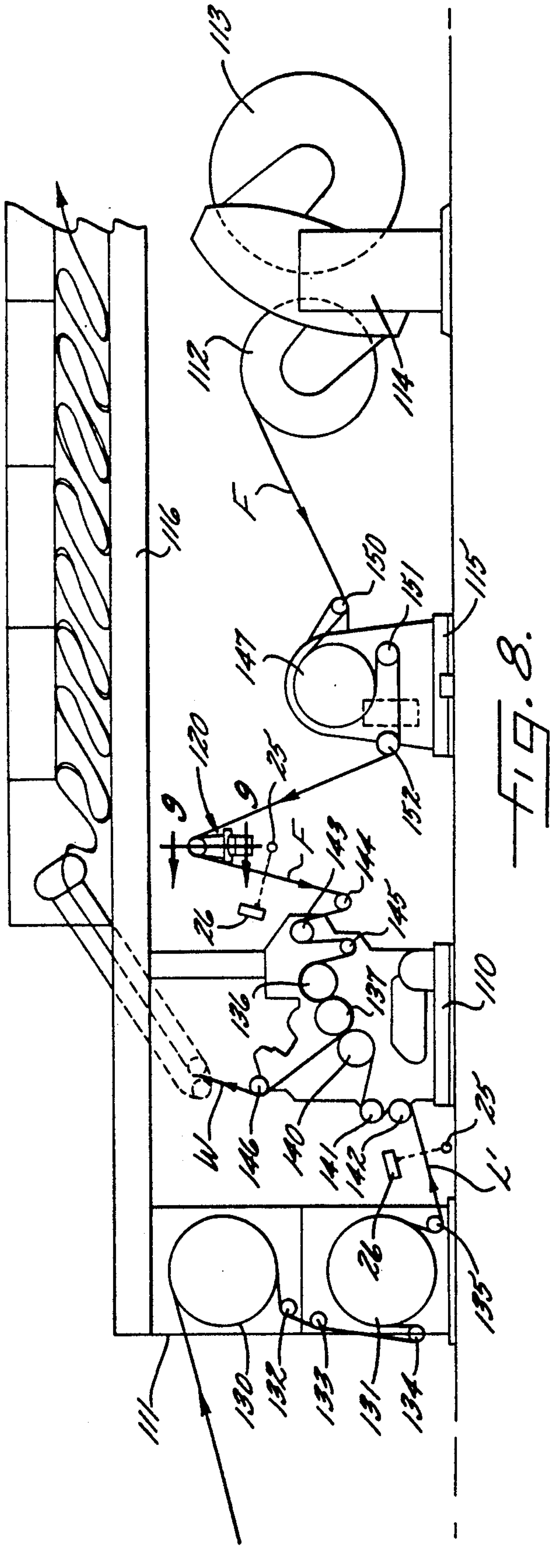
FIG. 8 is a side elevational view of a portion of a corrugator line and showing the supply rolls and the single facer.
Figure 9:
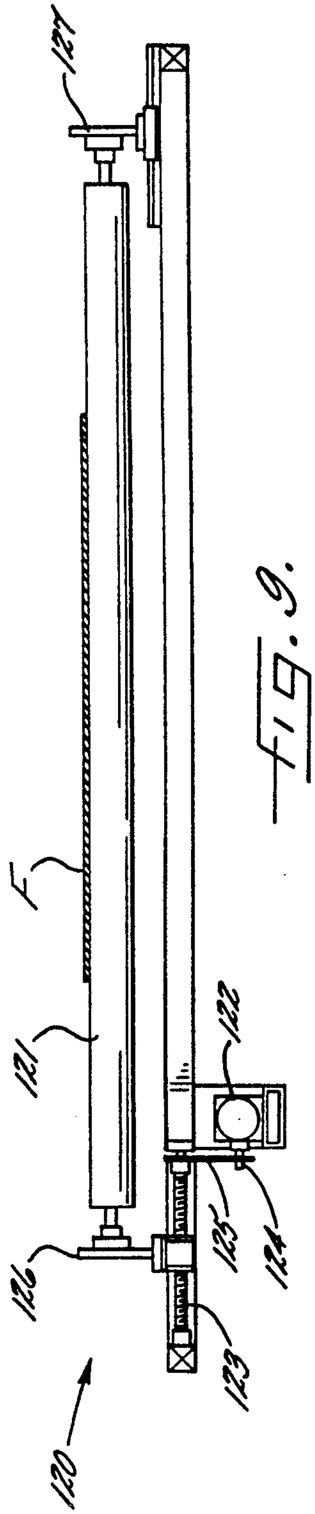
FIG. 9 is a cross sectional view taken along lines 9—9 of FIG. 8.

FIGS. 8 and 9 illustrate that the invention further comprises measuring the position of a first paper liner L' as the liner L' is being fed into a single facer 110. Another light source 25 and camera 26 as described previously are used to measure the position of the paper liner L' as the liner is being fed into the single facer 110 and to generate a signal representative of the measured position. FIG. 8 also shows that the liner L' is first treated by a preheater 111 which, by controlling the temperature and moisture content of the liner L', optimizes its condition for being forced into the single face web.

At the same time, a web of paper F which becomes the fluting in the single face web W is fed from a pair of supply rolls 112 and 113 carried by a roll stand 114. The paper web F is also treated in a preheater 115 for the same purposes as the liner L' is treated. In this application of the invention, the web F represents the objective with which the liner L' must be aligned.

The detailed structure and operation of preheaters and the single facer are well known to those skilled in the art and will not otherwise be described herein. Also, it will be understood that, although the terms "liner" and "web" are used with respect to the precursors of the single face web, the paper portions they describe can be essentially identical so that the terms "liner" and "web" are used to distinguish them from one another in this description, rather than to exaggerate any particular differences between them.

The position of the paper web F is also measured as it is being fed into the same single facer 110 as the liner L' to form the single face web. Another light source 25 and camera 26 are used to measure this position and to generate a signal which is representative of the liner's position.

The measured positions of the first liner L' and the web F are then aligned with respect to one another and with respect to the single facer 110 in response to the generated signals to substantially and accurately superimpose the liner L' and web F upon one another and thereby reduce or eliminate wasted paper along the edges of the resulting single face web W. As further illustrated in FIG. 8, the single face web W can proceed along a bridge 116 which for all practical purposes may be entirely similar to the bridge 11 discussed earlier herein.

FIGS. 8 and 9 also show from a more particular standpoint that the step of aligning the measured position of the first liner L' and the web W can be accomplished by using the vacuum means described earlier herein, or by adjusting the running position of the web F as it passes over an idler roll assembly broadly designated at 120. The idler roll assembly comprises an idler roll 121 upon which the web F rides. The position of idler roll 121 can be adjusted with respect to the single facer 110 and the first liner L' using the adjustment mechanism illustrated in FIG. 9. In the adjustment mechanism, a motor 122 drives a screw or threaded shaft 123 using for example a driving shaft 124 and a driving belt 125. The idler roll 121 is mounted on respective followers 126 and 127 in which follower 126 is moved by the rotation of the threaded shaft 123 and follower 127 can either slide or roll in response. In the illustrated embodiment, the step of aligning the liner L' and the web E that becomes the fluting comprises moving the position of the web F to match the position of the liner L', but it will be understood that the method can equivalently comprise aligning the liner and the web by moving the position of the liner L, to match the position of the web F.

In another embodiment, the position of the web F' can be adjusted by adjusting the position of the rolls 112 and 113 on the roll stand 114, or even by adjusting the position of the roll stand 114 itself.

Furthermore, although the illustrations show the liner L' and the web F being aligned before web F is fluted, it will be understood that the invention is just as appropriately beneficial where a fluting is formed first and then its position measured and aligned before it is formed with a liner into a single face web.

FIGS. 8 and 9 also include a number details which are essentially standard in such arrangements. These include the conditioning rolls 130 and 131, the respective idler rolls 132, 133, 134, and 135 in the preheater 111, the fluting rolls 136 and 137 in the single facer 110, pressure roll 140, integral preheaters 141 and 142, a steam shower drum 143 and various idler rolls 144, 145, and 146. Preheater 115 also includes a preheater roll 147 and idling rolls 150, 151, and 152.

Figure 10:
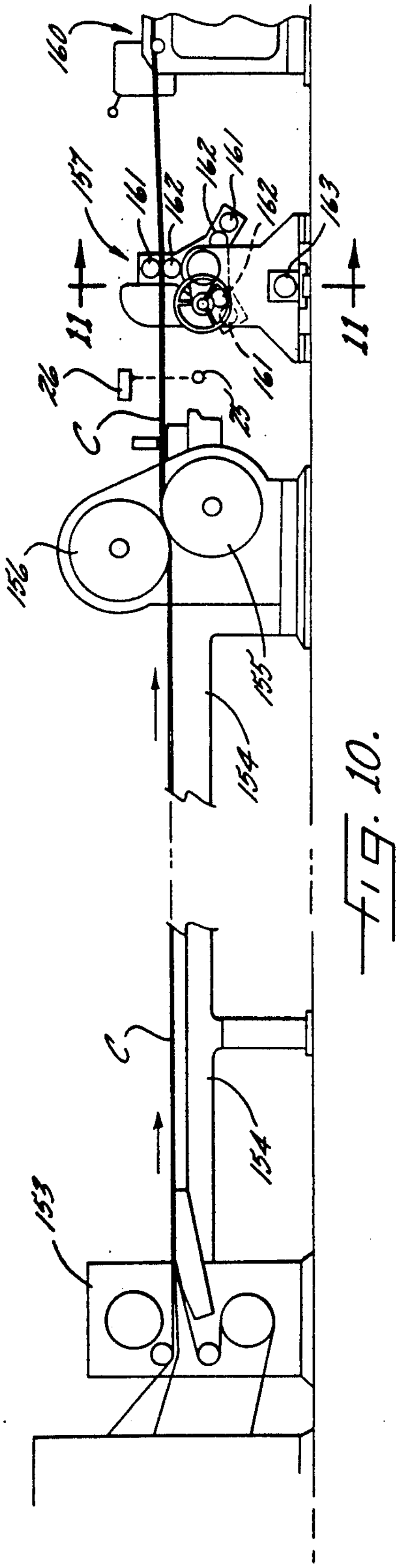
FIG. 10 is a side elevational view of a later portion of a corrugator line and in particular showing the position of the slitter-scorer.
Figure 11:
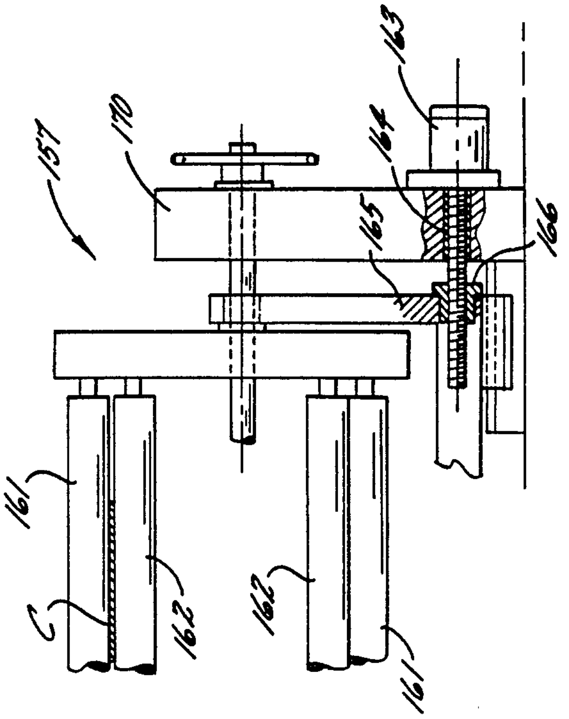
FIG. 11 is a cross sectional view taken along lines 11—11 of FIG. 10.

FIGS. 10 and 11 illustrate the alignment that takes place at the other end of the corrugating line after the corrugated board has been formed.

FIG. 10 shows a double backer 153 which in all respects can be similar or identical to the double backer 13 illustrated in FIG. 1. From the double backer 153, the finished corrugated product C progresses along another bridge 154. The length of the bridge 154 is selected along with the speed of advance of the corrugated product C to define a particular residency time period for the corrugated product C that allows the adhesive to dry, or the moisture of the various treatment processes to evaporate, or some other similarly desired or required step.

Following its residency on the bridge 154, the corrugated product C travels to and through the pulling rolls 155 and 156. As is known to those familiar with the production of corrugated board, the board is typically pulled away from the double backer so that it can be moved without slippage to ensure accurately cut sheet lengths.

As part of the invention, the method then comprises aligning a measured position of the corrugated board C with respect to a slitter broadly designated at 157 in response to a signal representative of that measured position in order to minimize the error in alignment between the corrugated board C and the slitter 157 and to thereby produce slit cardboard with a minimum of waste. In this embodiment of the invention, the slitter 157 represents the objective with which the corrugated board C must be aligned. As in the earlier portions of the description, the position of the corrugated board C is measured using a detector system which comprises a light source 25 and a line scanning camera 26 that together define a light path therebetween. The source 25 and camera 26 are positioned so that one edge of the corrugated product C passes through the light path, and the point of interference of the edge with the light path generates a signal representing the position of the corrugated product C. As stated earlier, in a preferred embodiment the camera and light source are positioned so that the light path is substantially perpendicular to the path of travel of the corrugated product C and substantially perpendicular to its plane as well.

In preferred embodiments of the invention, the slitter 157 is a slitter-scorer that is typically placed between the double facer 153 and an otherwise conventional cut off device broadly designated at 160. The slitter-scorer trims the sides of the corrugated board C and slits it into desired widths. Each width can be simultaneously scored to subdivide it into the depth and flaps of the box that it is intended to form.

As generally illustrated in FIG. 10, the slitter-scorer 157 has three operating stations spaced 120° apart. Each station contains a pair shafts 161 and 162 upon which upper and lower slitting heads and scoring heads (not shown) are mounted. The purpose of the three station machine is to enable the machine to be set up for two orders in advance without sacrificing any production time as orders are changed. The advance set up feature is particularly useful for short run orders. As used in accordance with the present invention, the slitter-scorer 157 is a conventional device, and will not otherwise be described in any particular detail.

As described earlier, the position of the board can be adjusted using a vacuum means, but in another preferred embodiment, the slitter-score 157 can be moved to match the position of the corrugated board C in order to align the corrugated board C and the slitter 157. As best illustrated in FIG. 11, the means for accomplishing this comprises a driving motor 163 and a driven screw or threaded shaft 164 which is operatively associated with the motor 163 for laterally moving the position of the slitter shafts 161 and 162 to match the position of the corrugated board C. FIG. 11 shows that at least the portion of the slitter-scorer 157 that is shown as the frame 165 is movable in response to the rotation of the shaft 164. In FIG. 11, frame 165 includes a nut-like follower 166 that shaft 164 will derive as it rotates. This in turn laterally moves frame 165 and rolls 161 and 162 to match the position of the corrugated board.

The remaining features illustrated in FIG. 11 are otherwise conventional and include an inner or spider frame member 167 in addition to the moveable frame member 165 as well as the outer or main frame member 170.

In the drawings and specification there have been disclosed typical preferred embodiments of the invention and although specific terms have been employed, they have been used in a generic and descriptive sense only and not for purposes of limitation, the scope of the invention being set forth in the following claims.

That which I claim is:

1. An alignment apparatus for continuously monitoring and aligning a web as the web is advanced along a processing or manufacturing line towards an objective with which the web must be aligned, and that is particularly useful in applications in which the web must be maintained at a desired tension at particular positions along the line, such as the location on a corrugating line at which a tensioned single face web and a liner are joined to form a composite laminated product, said alignment apparatus comprising:

a laterally adjustable web guide comprising vacuum tensioning means for applying a desired tension to a web, and said vacuum tensioning means being laterally adjustable with respect to the direction of travel along the line of a web to which said means applies tension so that lateral adjustment of said vacuum tensioning means laterally adjusts the path of travel of the tensioned web;

a detector system adjacent said vacuum tensioning means for identifying the position of the tensioned web, the position of an objective and the relative position of the tensioned web and the objective with respect to each other, and for generating a signal representing the relative position and wherein the position of said detector system adjacent said laterally adjustable vacuum tensioning means minimizes the amount of detected misaligned web material that progresses along the line between detection and alignment; and means responsive to said detector system for laterally moving said vacuum tensioning means in response to a signal from said detector system so that the lateral movement of said vacuum tensioning means laterally adjusts the position of the tensioned web with respect to the objective so that any misalignment between the tensioned web and the objective is minimized or eliminated when the tensioned web and the objective are aligned.

2. An apparatus according to claim 1 wherein said detector system comprises a light source and a detector, one of which is positioned on one side of the path of travel of the web and the other of which is positioned on an opposite side of said path of travel with said source and said detector defining a light path therebetween that is substantially perpendicular to both the path of travel and the plane of the web, and wherein the interference of the web with said light path from said source to said detector generates a signal representing the position of the web.

3. An alignment apparatus according to claim 1 wherein said detector system comprises a line scanning camera and a light source that together define a light path therebetween and positioned so that one edge of a web travelling along the line passes through said light path whereby the point of interference of the edge of the web with the light path generates a signal representing the position of the web.

4. An alignment apparatus according to claim 3 wherein said light source comprises a line source.

5. A paper web alignment system in an apparatus for making a corrugated paper product, said alignment system including at least an alignment apparatus for continuously monitoring and aligning a single face web and a separated liner as the single face web and liner are advanced along a corrugating line towards a location at which the single face web and liner are joined to form a composite laminated product, and that is particularly useful in applications in which the web must be maintained at a desired tension at particular positions along the line, said alignment apparatus comprising:

a moveable web guide comprising vacuum tensioning means for applying a desired tension to a single face web, and said vacuum tensioning means being laterally adjustable with respect to the direction of travel of the single face web to which said means applies tension and the liner along the corrugating line so that lateral adjustment of said vacuum tensioning means laterally adjusts the path of travel of the tensioned single face web;

a detector system adjacent said vacuum tensioning means for identifying the position of the tensioned single face web, the position of the liner and the relative position of the single face web and the liner with respect to each other, and for generating a signal representing the relative position, and wherein the position of said detector system adjacent said laterally adjustable vacuum tensioning means minimizes the amount of detected misaligned web material that progresses along the line between detection and alignment; and means responsive to said detector system for laterally moving said vacuum tensioning means in response to a signal from said detector system so that the lateral movement of said vacuum tensioning means laterally adjusts the position of the tensioned single face web with respect to the liner so that any misalignment between the tensioned single face web and the liner is minimized or eliminated when the tensioned single face web and the liner are brought together to form a composite laminated product.

6. An alignment system according to claim 5 and further comprising:

means for measuring the respective positions of a first paper liner and a paper fluting prior to their respective entry into a single facer and for generating a signal representative of the measured positions; and means responsive to the generated signal for aligning the liner and fluting to thereby accurately superimpose the liner upon one another and substantially reduce or eliminate wasted paper along the edges of the resulting single face web.

7. An alignment system according to claim 5 and further comprising:

means for measuring the position of a composite laminated corrugated board with respect to a slitter prior to the board's entry into the slitter and for generating a signal representative of the measured position; and means responsive to the generated signal for aligning the board and the slitter to thereby produce slit cardboard with a minimum of waste throughout the entire process.

8. An alignment system according to claim 5 further comprising a double backer downstream from said web guide where the single face web and the liner are joined to form a resulting composite laminated product.

9. An alignment apparatus for continuously monitoring and aligning paper webs superimposed upon one another such as a single face web and liner which are brought together to form one or more layers of corrugated cardboard type material, and that is particularly useful in applications in which the web must be maintained at a desired tension at particular positions along a manufacturing line, the apparatus comprising:

a single facer for fastening a first paper liner to a fluted paper liner to form a single face web;

a double backer for fastening a second paper liner to the single face web formed at said single facer;

a bridging conveyor system between said single facer and said double backer and including a bridge guide, said bridge guide comprising vacuum tensioning means for applying a desired tension to the single face web formed at said single facer;

a first light source and detector adjacent said vacuum tensioning means for generating a signal identifying the position of the tensioned single face web;

a second light source and detector adjacent said vacuum tensioning means for generating a signal identifying the position of the second paper liner and its relative position with respect to the tensioned single face web; and means for laterally moving said vacuum tensioning means in response to the signals identifying the relative positions of the single face web and the second paper liner so that the lateral movement of said vacuum tensioning means laterally adjusts the position of the tensioned single faced web with respect to the second paper liner so that any misalignment between the tensioned single face web and the second paper liner is minimized or eliminated when the tensioned single faced web and the second paper liner are brought together to form a corrugated paper product, and wherein the position of said detector system adjacent said laterally adjustable vacuum tensioning means minimizes the amount of detected misaligned web material that progresses along the line between detection and alignment.

10. An apparatus according to claim 9 wherein said vacuum tensioning means comprises:

a vacuum platen across which the single face web travels and through which a vacuum suction is applied to the single face web as it travels thereacross for urging the single face web against said vacuum platen and for thereby applying a desired tension to the single face web as it travels from said single facer to said double backer; and suction means for applying a vacuum suction to said vacuum platen.

11. An apparatus according to claim 10 wherein said means for laterally moving said vacuum tensioning means comprises means for moving said vacuum platen in a direction perpendicular to the direction in which the single face web travels across said vacuum platen and while suction is being applied to said vacuum platen so that movement of said vacuum platen correspondingly moves the single face web in the same direction thereby aligning the respective positions of the single face web and the second paper liner with one another.

12. An apparatus according to claim 9 wherein said means for laterally moving said vacuum tensioning means comprises;

an electric motor operatively associated with said vacuum tensioning means for changing the position of said vacuum tensioning means in response to a frequency signal;

a central processing unit for processing a signal from said detectors and producing a voltage signal in response thereto; and a voltage-frequency converter for producing a frequency signal to said electric motor in response to a voltage signal from said central processing unit.

13. An apparatus according to claim 9 and further comprising:

a supply of a first substantially planar paper liner;

a supply of fluted paper;

means for advancing paper liner from said first supply to said single facer;

means for advancing fluted paper to said single facer;

a preheater adjacent said single facer for heating paper from said first supply to a desired temperature prior to advancing the paper liner to said single facer; and a glue station adjacent said single facer and positioned therebetween for applying glue to a fluted paper liner prior to advancing the fluted paper liner into said single facer.

14. An apparatus according to claim 9 further comprising:

a preheater adjacent said double backer for heating the single face web and the second paper liner to a desired temperature prior to advancing the single face web and the second paper liner to said double backer; and a glue station adjacent said double backer and positioned therebetween for applying glue to the single face web prior to advancing the single face web into said double backer.

15. An apparatus according to claim 9 further comprising:

a supply of a second substantially planar paper liner; and means for advancing the second paper liner to the double backer.

16. An apparatus for producing slit pieces of finished corrugated board from paper web material while minimizing or substantially eliminating waste along a corrugating lien that includes at least a single facer for superimposing a paper fluting and a first paper liner to form a single face web, a double backer downstream of the single facer for superimposing the single face web and a second paper liner to form a corrugated board, and a slitter downstream of the double backer for slitting the corrugated board into desired predetermined sections, the apparatus comprising:

a first detector system adjacent said single facer for identifying the relative position of the fluting and the first liner with respect to each other prior to their entry into said single facer and for generating a signal representative of the relative position;

means responsive to said first detector system for adjusting the relative position of the fluting and first liner in response to a signal from said first detector system so that any misalignment between the fluting and first liner is minimized or eliminated when the fluting and the first liner are brought together to form the single face web;

a moveable web guide comprising vacuum tensioning means for applying a desired tension to a single face web, and said moveable web guide being laterally adjustable with respect to the direction of travel of the single face web along the corrugating line so that lateral adjustment of said web guide laterally adjusts the path of travel of the tensioned single face web;

a second detector system adjacent said web guide for identifying the relative position of the single face web, and the second liner with respect to each other, and for generating a signal representing the relative position;

means responsive to said second detector system for laterally adjusting the position of said vacuum tensioning means in response to a signal from said second detector system so that the tensioned single face web can be adjustably positioned with respect to the second liner so that any misalignment between the tensioned single face web and the liner is minimized or eliminated when the tensioned single face web and the liner are brought together to form a composite laminated corrugated board product, and wherein the position of said second detector system adjacent said laterally adjustable vacuum tensioning means minimizes the amount of detected misaligned web material that progresses along the line between detection and alignment;

a third detector system adjacent said slitter for identifying the position of the corrugated board relative to the slitter and for generating a signal representing the relative position; and means responsive to said third detector system for adjusting the relative position of the corrugated board and the slitter in response to a signal from said third detector system so that the corrugated board and the slitter can be adjustably positioned with respect to one another so that any misalignment between the corrugated board and the slitter is minimized or eliminated when the corrugated board is slit.

17. An apparatus according to claim 16 wherein said slitter comprises a slitter-scorer.

18. An apparatus according to claim 16 wherein each of said first, second, and third detector systems comprises a light source and a detector, one of which is positioned on one side of the path of travel of the respective fluting, liner, single face web, or corrugated board and the other of which is positioned on an opposite side of said path of travel with said source and said detector defining a light path therebetween that is substantially perpendicular to both the path of travel and the plane of the web, and wherein the interference of the respective fluting, liner or single face web with said light path from said source to said detector generates a signal representing the position thereof.

19. An apparatus according to claim 16 wherein said detector system comprises a line scanning camera and a light source that together define a light path therebetween and positioned so that one edge of a respective fluting, liner, single face web, or corrugated board travelling along the corrugating line passes through said light path whereby the point of interference of the edge thereof with the light path generates a signal representing the position of the respective fluting, liner, single face web or corrugated board.

20. An apparatus according to claim 19 wherein said light source comprises a line source.

21. An apparatus according to claim 16 wherein said means responsive to said first detector system comprises a driving motor and a driven screw operatively associated therewith for laterally moving the position of a stock supply of the first liner to match the position of the fluting.

22. An apparatus according to claim 16 wherein said means responsive to said third detector system comprises a driving motor and a driven screw operatively associated therewith for laterally moving the position of said slitter to match the position of the corrugated board.

23. An apparatus according to claim 21 or 22 wherein said driven screw comprises a threaded shaft.

24. A method of aligning a tensioned web with an objective as the tensioned web is being advanced along a processing or manufacturing corrugating line towards an objective such as a double backer on a corrugating line where a tensioned single face web and a liner are joined to form a corrugated paper product, the method comprising:

applying a tensioning vacuum to a portion of the web as it is advanced along the line, which vacuum is sufficient to impart a desired tension to the web while allowing the web to continue to travel under tension towards the objective;

generating a signal identifying the relative positions of the portion of the web to which the vacuum is being applied and the position of the objective with respect to one another at a position adjacent the position where the vacuum is applied to thereby determine any misalignment in the respective positions which would result in misalignment between the web and the objective; and laterally moving the position of the portion of the web to which the vacuum is applied and in response to the generated signal to thereby laterally adjust the position of the entire web with respect to the objective so that any misalignment of the web and the objective is minimized or eliminated, and wherein the step of generating a signal at a position adjacent the position where vacuum is applied minimizes the amount of detected misaligned web material that progresses along the line between detection and alignment.

25. A method of aligning a tensioned single face web and a liner as the tensioned single face web and liner are being separately advanced along a corrugating line towards a double backer where the tensioned single face web and liner are joined to form a corrugated paper product, the method comprising:

applying a tensioning vacuum to a portion of the single face web as it is advanced along the corrugating line, which vacuum is sufficient to impart a desired tension to the single face web while allowing the web to continue to travel under tension towards the double backer;

generating a signal identifying the relative positions of the portion of the tensioned single face web to which the vacuum is being applied and the position of the corresponding portion of the liner with respect to one another at a position adjacent the position where the vacuum is applied to thereby determine any misalignment in the respective positions which would result in misalignment and waste in the resulting corrugated paper product; and laterally moving the position of the portion of the tensioned single face web to which the vacuum is applied and in response to the generated signal to thereby adjust the position of the entire tensioned single face web with respect to the liner so that any misalignment of the tensioned single face web and the liner is minimized or eliminated and any waste edges in the resulting corrugated paper product are likewise minimized or eliminated, and wherein the step of generating a signal at a position adjacent the position where vacuum is applied minimizes the amount of detected misaligned web material that progresses along the line between detection and alignment.

26. A method according to claim 25 wherein the step of generating a signal identifying the relative positions of the single face web and liner comprises:

generating a first signal identifying the position of the a respective edge portion of the single face web; and generating a second signal identifying the position of the corresponding respective edge portion of the liner;

and wherein the step of adjusting the position of the single face web comprises:

comparing the first and second signals that identify the respective positions of the single face web and the liner; and moving the single face web in response to the compared signals.

27. A method according to claim 26 wherein the step of identifying the respective edge portions comprises establishing a light curtain between a light source and a photo detector adjacent the corresponding positions of the advancing single face web and liner along the corrugating line and identifying the interference of the respective edge portions with the light curtain.

28. A method according to claim 25 of producing slit pieces of finished corrugated paper product from respective paper lines and at least one fluting using a corrugator line that includes at least a single facer, a double backer and a slitter, and further comprising the steps of:

aligning the measured positions of a first paper liner and a paper fluting relative to one another and relative to the single facer prior to their respective entry into the single facer and in response to a signal representative of the relative measured positions to thereby accurately superimpose the liner and fluting upon one another and substantially reduce or eliminate wasted paper along the edges of the resulting single face web; and aligning a measured position of the corrugated paper product with respect to the slitter in response to a signal representative of the measured position to minimize the error in alignment between the corrugated paper product and the slitter and to thereby produce slit cardboard with a minimum of waste throughout the entire process.

29. A method according to claim 28 wherein the step of aligning the first paper liner and the fluting comprises moving the position of the liner to match the position of the fluting.

30. A method according to claim 28 wherein the step of aligning the first paper liner and the fluting comprises moving the position of the fluting to match the position of the liner.

31. A method according to claim 28 wherein the step of aligning the corrugated board and the slitter comprises moving the position of the slitter to match the position of the corrugated board.

32. A method according to claim 28 wherein the step of aligning the corrugated board and the slitter comprises moving the position of the corrugated board to match the position of the slitter.

33. A method of producing slit pieces of finished corrugated board from paper web material while minimizing or substantially eliminating waste, the method comprising:

measuring the position of a first paper liner as the liner is being fed into the single facer of a corrugating line and generating a signal representative of the measured position;

measuring the position of a paper web as the web is being fed into the same single facer as the first liner wherein the web is fluted and joined to the first liner to form a single face web, and generating a signal representative of the measured position of the paper web;

aligning the measured positioned of the first liner and the web with respect to one another and with respect to the single facer in response to the generated signals to substantially and accurately superimpose the liner and the web upon one another and thereby reduce or eliminate wasted paper along the edges of the resulting single face web;

measuring the position of the single face web as the single face web moves between the single facer and the double backer and generating a signal representative of the measured position;

measuring the position of a second paper liner as the second liner is directed to the double backer and generating a signal representative of the measured position;

laterally moving the position of the second liner at a position adjacent the position where the position of the second paper liner is measured by passing the second liner over a laterally moveable vacuum tensioning means and moving the vacuum tensioning means laterally in response to the generated signals in order to concurrently move and align the second liner with the single face web to substantially and accurately superimpose the second liner and the single face web upon one another and thereby reduce wasted paper along the edges of the resulting corrugated board, and wherein the step of laterally moving the second liner at a position adjacent the position where the position of the second paper liner is measured minimizes the amount of detected misaligned web material that progresses along the line between detection and alignment;

measuring the position of the corrugated board prior to its entry into a slitter and generating a signal representative of the measured position; and adjusting the relative positions of the corrugated board and the slitter in response to the generated signal to minimize the error in alignment between the two and to thereby produce split cardboard with a minimum of waste throughout the entire process.

34. A method according to claim 33 wherein the step of generating a signal identifying the relative positions of the single face web and liner comprises:

generating a first signal identifying the position of the a respective edge portion of the single face web; and generating a second signal identifying the position of the corresponding respective edge portion of the liner;

and wherein the step of adjusting the position of the single face web comprises:

comparing the first and second signals that identify the respective positions of the single face web and the liner; and moving the single face web in response to the compared signals.

35. A method according to claim 34 wherein the step of identifying the respective edge portions comprises establishing a light curtain between a light source and a photo detector adjacent the corresponding positions of the advancing single face web and liner along the corrugating line and identifying the interference of the respective edge portions with the light curtain.

* * * * *